United States Patent [19]
Okazaki et al.

[11] Patent Number: 5,677,034
[45] Date of Patent: Oct. 14, 1997

[54] BIAXIALLY ORIENTED, LAMINATED POLYESTER FILM

[75] Inventors: Iwao Okazaki, Kyoto; Tohru Miyake, Otsu; Koichi Abe, Kyoto; Keisuke Ohshima, Otsu, all of Japan

[73] Assignee: Toray Industries, Inc., Japan

[21] Appl. No.: 540,904

[22] Filed: Oct. 11, 1995

Related U.S. Application Data

[62] Division of Ser. No. 297,611, Aug. 29, 1994, Pat. No. 5,532,047.

[30] Foreign Application Priority Data

Aug. 30, 1993 [JP] Japan .................... 5-235879

[51] Int. Cl.⁶ .................. G11B 5/66; B32B 3/10
[52] U.S. Cl. .............. 428/141; 428/143; 428/213; 428/323; 428/328; 428/402.24; 428/404; 428/405; 428/406; 428/480; 428/483; 428/694 ST; 428/694 SL; 428/694 SG; 428/900
[58] Field of Search ................... 428/141, 143, 428/213, 402.24, 323, 404, 405, 480, 406, 483, 328, 910, 900, 694 ST, 694 SL, 694 SG

[56] References Cited

U.S. PATENT DOCUMENTS

| | | | |
|---|---|---|---|
| 5,069,962 | 12/1991 | Okazaki et al. | 428/323 |
| 5,284,699 | 2/1994 | Nishino et al. | 428/217 |
| 5,336,079 | 8/1994 | Okazaki et al. | 428/323 |
| 5,532,047 | 7/1996 | Okazaki | 428/213 |

FOREIGN PATENT DOCUMENTS

| | | |
|---|---|---|
| 0 522 412 A1 | 1/1993 | European Pat. Off. . |
| 0 523 596 A1 | 1/1993 | European Pat. Off. . |
| 0 543 600 A3 | 5/1993 | European Pat. Off. . |
| 2-77431 | 3/1990 | Japan . |
| 3-90329 | 4/1991 | Japan . |
| 4-278349 | 10/1992 | Japan . |
| 4-278350 | 10/1992 | Japan . |
| 4-336227 | 11/1992 | Japan . |

*Primary Examiner*—Leszek Kiliman
*Attorney, Agent, or Firm*—Austin R. Miller

[57] ABSTRACT

Disclosed is a biaxially oriented, laminated polyester film having a lamination structure with at least two layers. At least one of the outermost layers of the film is a thin laminated layer A having a thickness of not more than 3 μm. In the layer A, internally formed particles and specified agglomerated particles or mono-dispersed particles are present, or the mono-dispersed particles are present at a very small content. When the polyester film is used as a base film for magnetic recording media, the abrasion resistance of the film surface at a high speed can be greatly increased.

11 Claims, No Drawings

BIAXIALLY ORIENTED, LAMINATED POLYESTER FILM

This application is a divisional of Application Ser. No. 08/297,611, filed Aug. 29, 1994, now U.S. Pat. No. 5,532,047.

BACKGROUND OF THE INVENTION

1. Field of the Invention

The present invention relates to a biaxially oriented, laminated polyester film particularly suitable as a base film for video tapes.

2. Description of the Related Art

As a biaxially oriented polyester film used as a base film for magnetic recording media, a film containing spherical silica particles originating from colloidal silica is known and described in, for example, JP-A-SHO 59-171623. Further, as a biaxially oriented, laminated polyester film, a polyester film, wherein a thin layer containing particles to form surface protrusions is laminated on a base layer, is also known and described in, for example, JP-A-HEI 2-77431.

In such conventional polyester films, however, there is a problem that a film surface, particularly, protrusions formed on the film surface, is likely to be abraded by a contacting roll or guide or an edge of an applicator, particularly accompanying with recent increase of a tape or film running speed in FF and REW modes of a video tape recorder, a calendering or applying process for making magnetic recording media, a dubbing process, or a process for incorporating a tape into a cassette. Further, there is a problem that the signal/noise ratio (S/N) when the film is processed into a video tape is not so good and it is difficult to obtain a sufficiently high-quality image when the original video tape formed from the film is dubbed particularly at a high dubbing speed which has been realized by a high-speed magnetic field transferring technology.

SUMMARY OF THE INVENTION

An object of the present invention is to provide a biaxially oriented, laminated polyester film whose surface is hardly abraded even in a high-speed running in a video tape recorder or in a high-speed process for processing the film as described above, and to provide a biaxially oriented, laminated polyester film which is suitable as a base film for video tapes wherein reduction of an image quality at the time of dubbing can be suppressed when the film is formed as a video tape, that is, a good electromagnetic conversion property can be obtained.

To accomplish this object and other objects, a biaxially oriented, laminated polyester film according to the present invention has a lamination structure with at least two layers, and is characterized in that at least one of outermost layers of the film is a thin laminated layer A having a lamination thickness of not less than 0.01 μm and not more than 3 μm. At least the thin laminated layer A contains internally formed particles (that is, non-incorporated particles). The thin laminated layer A may contain agglomerated particles having a mean degree of agglomeration of 5 to 100 at a content of 0.01–2% by weight, each of the agglomerated particles being formed from particles having a mean primary particle diameter of 5 to 200 nm.

Another biaxially oriented, laminated polyester film according to the present invention has a lamination structure with at least two layers, and is characterized in that at least one of outermost layers of the film is a thin laminated layer A having a lamination thickness of not less than 0.01 μm and not more than 3 μm, and the thin laminated layer A contains mono-dispersion particles having a mean degree of agglomeration of less than 5 and a mean primary particle diameter of not less than 0.05 μm and not more than 3 μm at a content of not less than 0.05% by weight and less than 0.3% by weight.

When such a biaxially oriented, laminated polyester film is used as a base film for magnetic recording media, the abrasion resistance of the film surface at a high speed can be greatly increased.

DETAILED DESCRIPTION OF THE PREFERRED EMBODIMENTS OF THE INVENTION

The present invention will be explained in more detail by embodiments and examples. However, the present invention is not restricted by the embodiments and examples.

We have found that an abrasion test determined using a razor at a high film-running speed is suitable as an index for determining whether a film surface is easily abraded or hardly abraded in a high-speed process. Further, we have also found that a low-speed razor abrasion test wherein a film is run on a razor at a low speed can become an index for determining the abrasion resistance of the film surface although it is slightly poor in accuracy as compared with the high-speed razor abrasion test. The low-speed razor abrasion test can be performed more simply and safely. The methods for performing these tests are described later in more detail.

As the result of investigation of the abrasion resistance of various films by the above-described two tests, it has been found that films having the following characteristics can achieve the objects of the present invention. Namely, in order to achieve a level at which the abrasion resistance in a high-speed process is no problem, the level determined by the above-described high-speed razor abrasion test must be not more than 180 μm. Further, in the low-speed razor abrasion test, the level must be not more than 40 μm. The methods for achieving these levels of not more than 180 μm in the high-speed razor abrasion test and not more than 40 μm in the low-speed razor abrasion test are classified schematically into the following two methods.

A first method is a method for forming a lamination portion of a biaxially oriented laminated film as a thin layer and generating internally formed particles in the thin laminated layer. A second method is a method for adding external particles at a very small content into the above thin laminated layer with the internally formed particles therein to form surface protrusions and thereby enlarging the intervals of the protrusions. In any case, the polyester film according to the present invention must have a lamination structure with at least two layers. If the film is a single-layer film, it is impossible or difficult to control both surfaces in optimum conditions different from each other. In the present invention, by forming as a lamination structure with two or more layers, for example, the surface of the layer A can be controlled to a good slipping surface and the surface of another outermost layer can be controlled to a flat surface. In a case of a lamination structure with three or more layers, an intermediate layer can be composed of a recycled polymer to contribute to save or recycle natural resources.

Further, in the present invention, the thickness of at least one of the outermost layers of the film (layer A) must be not less than 0.01 μm and not more than 3 μm. By forming such a thin laminated layer A, particles present in the layer do not sink deeply into the interior of the film and protrusions having a uniform height can be formed on the film surface.

The above-described first method will be explained in detail. A biaxially oriented polyester film used as a base film of a video tape is generally added with particles to form protrusions on the surface thereof in order to reduce the friction of the film surface. Among the protrusions thus formed, excessively large protrusions are likely to be broken in a high-speed process. The fragments generated by the break of the protrusions cause dropout at the time of recording or regenerating a video tape. As materials forming such excessively large protrusions, particularly large mono-dispersed particles among added particles, agglomerated particles formed by agglomeration of added particles and contaminated materials in a polymer preparing process can be raised. Further, when external particles such as spherical silica particles are used as the particles to be added to a film, because they are poor in affinity with the matrix polymer forming the film, voids are liable to be generated around the particles. Therefore, when an impact is applied to the protrusions formed, the particles present beneath the protrusions are likely to fall off.

Accordingly, in order to prevent such defects, protrusions are formed by internally formed particles. The internally formed particles are very good in affinity with the base material, and can form surface protrusions while achieving a condition of strong bonding with the base material. By containing such internally formed particles in the thin laminated layer A, broad protrusions having a uniform height can be formed on the film surface. In this case, a small amount of external particles may be used together with the internally formed particles, as needed. The protrusions formed by the external particles, which are present between the protrusions formed by the internally formed particles, are protected in a high-speed process by the broad protrusions formed by the internally formed particles, and as a result, the abrasion of the protrusions formed by the external particles and the falling of the external particles can also be prevented. Thus, external particles other than internally formed particles may be contained in the thin laminated layer A. The abrasion resistance at high speed and the electromagnetic conversion property of the film can further improved by using other appropriate particles together.

As the external particles added to the layer A, agglomerated particles (A) having a mean degree of agglomeration of 5 to 100 each of which are formed from particles having a mean primary particle diameter of 5 to 200 nm, preferably 10 to 100 nm, are preferred. As the content thereof, not more than 2% by weight, preferably 0.05 to 2% by weight, more preferably 0.1 to 1% by weight is preferred. If the content is more than 2% by weight, there is a possibility that excessively large particles having a too large degree of agglomeration are generated. As the kinds of the particles, for example, alpha-type, gamma-type, delta-type or theta-type alumina particles, zirconia particles, silica particles and titanium particles can be used. These particles substantially do not form protrusions on the film surface, and are added mainly in order to reinforce the skin of the surface.

As the particles added for the purpose of reducing the friction of the film surface by forming protrusions among external particles added to the layer A, mono-dispersed particles (B) having a mean degree of agglomeration of less than 5, which have a mean primary particle diameter of 0.05 to 3.0 µm, preferably 0.1 to 2 µm, more preferably 0.2 to 1 µm, can be used. As the kinds of such particles (B), calcium carbonate particles, mono-dispersed silica particles, divinylbenzene particles, silicone particles, titanium oxide particles, silicon carbide particles, silicon nitride particles, titanium nitride particles and tin oxide particles can be raised. The content thereof is preferably not more than 3% by weight, more preferably in the range of 0.01 to 3% by weight, still more preferably in the range of 0.05 to 3% by weight, and further more preferably in the range of 0.05 to 2% by weight. If the content is less than 0.01% by weight, the friction is likely to increase. If the content is more than 3% by weight, non-dispersed and agglomerated particles are likely to be present, and they are likely to cause an abrasion in a high speed process.

In these mono-dispersed particles (B), the mean primary particle diameter "d" (µm) of the mono-dispersed particles and the thickness "t" (µm) of the thin laminated layer A preferably satisfies the equation $0.2\ d \leq t \leq 10\ d$, and more preferably satisfies the equation $0.3\ d \leq t \leq 5\ d$.

Next, the above-described second method will be explained in detail. In this method, the internally formed particles are not used, and only the external particles are used. Although the internally formed particles have various advantages as aforementioned, there is a case where the electromagnetic conversion property slightly deteriorates because they form broad protrusions. In a case where a particularly high-level electromagnetic conversion property is required, only the particles for forming protrusions which belong to the above-described particles (B) may be added to the thin laminated layer A without using the internally formed particles. In this case, the content of such particles relative to the thin laminated layer A is preferably not less than 0.05% by weight and less than 0.3% by weight, more preferably not less than 0.1% by weight and less than 0.3% by weight. Although the aforementioned particles (A) may be used to reinforce the skin of the film surface also in this case as needed, it is desired that the content thereof is controlled preferably not more than 1% by weight, more preferably not more than 0.7% by weight, further more preferably not more than 0.5% by weight.

In the film according to the present invention, mainly with respect to the formation of the protrusions on the layer A, the parameter of surface roughness (P10) is preferably not more than 350 nm, more preferably not more than 300 nm. If the parameter is more than this value, there is a fear that the abrasion resistance at high speed and the electromagnetic conversion property decrease.

Further, with the height of the surface protrusions of the layer A, the relative standard deviation of height distribution thereof is preferably not more than 1.2, more preferably not more than 1.0. If the relative standard deviation is more than this value, there is a fear that undesired excessively large protrusions are generated, such protrusion portions are likely to be abraded and thereby reducing the abrasion resistance at high speed, as well as the electromagnetic conversion property decreases.

Furthermore, in the film according to the present invention, the other surface layer B is not particularly restricted, and the constitution of the layer B can be decided depending upon the requirements for the surface of the layer B. For example, in a case where the surface of the layer B is required to be formed as flat as possible, the content of particles (external particles and/or internally formed particles) in this layer may be suppresses small. In such a manner, the surface of the layer A can be formed to have an excellent abrasion resistance at high speed, to form surface protrusions having uniform and desired height and to have an excellent electromagnetic conversion property, and at the same time, the surface of the layer B can be formed as a required flat surface.

In the polyester film according to the present invention, at least one of the layers constituting the film must be biaxially oriented. It is particularly preferred that all layers of the lamination structure are biaxially oriented. If all layers are non-oriented or uniaxially oriented, the characteristics aimed by the present invention cannot be satisfied.

Although the polyester constituting the film according to the present invention is not particularly restricted, a polyester containing at least one structural unit of ethylene terephthalate, ethylene-α, β-bis(2-chlorophenoxy)ethane -4,4'-dicarboxylate and ethylene 2,6-naphthalate as its main constituent is particularly preferred. Among these, a polyester containing ethylene terephthalate as its main constituent is particularly preferred. Two or more kinds of polyesters may be blended and a copolymerized polymer may be used, unless the advantages according to the present invention are damaged.

In the film according to the present invention, other polymers may be blended as long as the objects of the present invention are not injured. Further, a generally used organic additive such as oxidation inhibitor, thermal stabilizer, lubricant and ultraviolet absorbent may be added by the volume usually employed.

The intrinsic viscosity (IV) of the polymer of the layer A of the laminated polyester film according to the present invention is preferably in the range of 0.4 to 0.9 to obtain a further excellent abrasion resistance at high speed. Further, the difference between the polymer IV of the layer A and the polymer IV of the layer B is particularly preferably not more than 0.1 to obtain a further excellent abrasion resistance at high speed.

Next, a process for producing the film according to the present invention will be explained. However, the process is not particularly restricted by the following one.

Firstly, as a process for preparing internally formed particles, the following process is effective. Namely, the internally formed particles are prepared by adding at least one of a calcium compound, a magnesium compound, a manganese compound and a lithium compound soluble to glycol, and preferably, a phosphate and/or an ester compound in an appropriate manner (a) in a process of condensation polymerization after a direct esterification of predetermined dicarboxylic acid and ethylene glycol or (b) in a process of condensation polymerization after a transesterification of predetermined dimethylester of dicarboxylic acid and ethylene glycol. In the addition of the compound for forming the internally formed particles, it is preferred that at least one of a calcium compound and a lithium compound is added to the reaction system as a glycol solution at an appropriate timing from the time when the esterification or the transesterification has substantially finished until the time when the condensation polymerization has not yet proceeded so much.

Where, as the calcium, magnesium, manganese and lithium compound to be used, compounds soluble to glycol, for example, an inorganic salt such as a halide, a nitrate and a sulfate, an organic salt such as an acetate, an oxalate and a benzoate, a hydride and an oxide, are preferably employed, and two or more compounds may be used together. As the phosphoric compounds, at least one of phosphoric acid, phosphorous acid and esters or partial esters thereof can be employed.

As the method for controlling the content of particles, a method for preparing a particle master having a high concentration by the above method and diluting the particle master with a polyester which substantially does not contain particles when the film is produced is effective. In the present invention, the concentration of the particle master is preferably in the range of 0.5 to 5% by weight.

Next, a polyester film having a two or more layer lamination structure is formed using the pellets of polyester thus prepared. The pellets of polyester prepared in the above manner are blended at a predetermined ratio, and after drying, they are supplied to known extruders for melt-extruding and lamination, molten polymers are delivered out from a die in a form of a sheet and the sheet is cooled and solidified on a casting roll to form a non-stretched film. Namely, the lamination is carried out by using two or more extruders and a die having a manifold or a feed block for two or more layers (for example, a feed block having a rectangular lamination portion), a molten sheet having two layers is delivered out from a die, the delivered sheet is cooled on a casting roll to form a non-stretched film. In such a manner, it is effective to install a static mixer and a gear pump in the polymer path. Further, it is effective to set the temperature of the extruder for extruding the thin laminated layer A lower than the temperature of the other extruder, for example, lower by 5° to 10° C.

Next, the non-stretched film obtained is biaxially stretched and biaxially oriented. As the stretching process, a sequentially biaxial stretching or a simultaneously biaxial stretching can be employed. Especially, a process for using a sequentially biaxial stretching, wherein firstly longitudinal stretching and secondly transverse stretching are carried out, is preferred, and a process for dividing the longitudinal stretching into three or more stages and setting the total draw ratio of the longitudinal stretching to 3.5 to 6.5 times is particularly preferred. Although it is difficult to determine the optimum temperature for the longitudinal stretching to a particular temperature because the optimum temperature varies depending on the kind of polyester, usually setting the temperature of the first stage to 50° to 130° C. and the temperatures of other stages after the first stage to a higher temperature is effective. The stretching rate in the longitudinal direction is preferably in the range of 5,000 to 50,000%/min. The transverse stretching is usually conducted using a stenter. The draw ratio of the transverse stretching is preferably in the range of 3.0 to 6.0 times. The stretching rate in the transverse direction is preferably in the range of 1,000 to 20,000%/min, and the temperature for the stretching is preferably in the range of 80° to 160° C. The biaxially stretched film thus formed is then heat treated. The temperature of the heat treatment is preferably in the range of 170° to 220° C., more preferably in the range of 180° to 200° C., and the time of the heat treatment is preferably in the range of 0.2 to 20 seconds.

Next, methods for determining the characteristics in the present invention and estimating the effects according to the present invention will be explained.

(1) Mean primary particle diameter of particles present in film

Polymer is removed from the film by plasma low temperature ashing treatment to expose the particles. The condition of the ashing treatment is selected such that the particles are not damaged whereas the polymer is ashed. The exposed particles are observed by a scanning electron microscope (SEM) and the image of the particles is processed by an image analyzer. The magnification of the SEM is about 2,000 to 10,000 times, and a visual field per one determination is appropriately selected from the range of one side length of 10 to 50 μm. Changing the portions to be observed, the volume mean diameter "d" of the particles of not less than 5,000 is determined from the diameters and volume rate thereof by the following equation.

$$d = \Sigma\, d_i \cdot Nvi$$

Where, $d_i$ is diameter of particle, and $Nv_i$ is volume rate thereof.

In a case where the particles are organic particles and the particles are greatly damaged by the plasma low temperature ashing treatment, the following method may be employed.

Using a transmission type electron microscope (TEM), the cross section of the film is observed at a magnification of 3,000 to 100,000 times. The thickness of a cut sample for the measurement of the TEM is set to 1,000 Å, not less than 500 fields are measured changing the fields, and the volume mean diameter "d" of the particles is determined from the above equation.

(2) Content of particles

The film is treated with a solvent which dissolves polyester but which does not dissolve the particles, and the particles are separated from the polyester by centrifugation. The content of the particles is defined as the ratio of the weight of the separated particles to the total weight of the film (% by weight). Alternatively, as needed, the determination may be carried out by utilizing infrared spectrophotometry.

(3) Lamination thickness of film

The depth profile of the particle density is determined by X-ray photoelectron spectrum (XPS), infrared spectroscopic analysis (IR) or a confocal microscope while etching from the surface. In the surface of the surface layer of a laminated film, the particle density is low because the surface is an interface, and the particle density increases as the measuring position is apart from the surface.

In the film laminated with a layer according to the present invention, the particle density becomes the maximum at a depth [I] and thereafter decreases again. Based on this distribution curve of the particle density, a depth [II] which indicates ½ of the maximum of the particle density is defined as the lamination thickness (where, II>I). Further, in a case where inorganic particles are contained, using an apparatus of secondary ion mass spectrum (SIMS), the ratio of the density of the element originating from the particles present at the highest density in the film to the density of the carbon in the polyester ($M^+/C^+$) is defined as the particle density ratio, and the determination is conducted from the surface of the layer A in the depth direction (thickness direction). The lamination thickness is determined in a manner similar to the above-described manner. The lamination thickness ca also be determined by observation of the cross section of the film or using a thin film step measuring apparatus.

(4) Mean degree of agglomeration of particles

The film containing particles is cut in the direction perpendicular to the surface plane of the film to make a very thin piece having a thickness of 1,000 Å. When the thin piece is observed at a magnification of about 100,000 times using a transmission type electron microscope (for example, JEM-1200EX: produced by Nippon Denshi Corporation, a Japanese company), a minimum particle which cannot be further divided (primary particle) can be observed. This observation is carried out on 20 fields of view, the number of primary particles forming each of agglomerated particles is counted, and the mean value of the number is defined as the mean degree of agglomeration.

(5) Relative standard deviation of height distribution of surface protrusions

The height data of the protrusions measured with a two beam and two detector type scanning electron microscope (ESM-3200; produced by Elionics Corporation) and a cross section measuring apparatus (PMS-1; produced by Elionics Corporation) by scanning them along the surface of the film setting the flat portion of the film surface as the base (height 0) is transferred to an image processor (IBAS-2000; produced by Karlzuis Corporation), and an image of the protrusions on the film surface is reconstructed on the display of the image processor. Then, a circle equivalent diameter of a protrusion is determined from the area of each protrusion obtained by processing the protrusion portion reconstructed on the display in a binary condition, and the determined circle equivalent diameter is defined as a mean diameter of the protrusion. Further, the highest value among the height data of the respective protrusion portions of a protrusion processed into a binary condition on the display is defined as a height of the protrusion, and this determination is repeated on the respective protrusions. The determination is repeated 500 times changing measuring portions, and in a condition where the height distribution of the determined protrusions is supposed to indicate a normal distribution whose center is on a point of height "0", the standard deviation is determined by least square approximation. The relative standard deviation of the height distribution of the particles is determined as the ratio of the obtained standard deviation to the mean height of the particles. The magnification of the scanning electron microscope is set in the range of 1000 to 8000 times.

(6) Parameter of surface roughness P10

Using a photo-interference type three-dimensional surface analyser (TOPO-3D; produced by WYKO Corporation, magnification of objective lens; 40–200 times, use of a high resolution camera is effective), the image of the protrusions of the film surface is constructed on the display of an image processor. The mean value of ten points from the highest protrusion portions of the image constructed on the display is defined as P10. The measurement is repeated twenty times and the mean value thereof is defined as the parameter of surface roughness P10 (unit: nm).

(7) Intrinsic viscosity of polymer (IV)

The intrinsic viscosity of polymer is determined at 25° C. using o-chlorophenol as the solvent.

(8) Abrasion resistance at high speed (high-speed razor abrasion test)

The film is slit into a tape having a width of ½ inch. The tape is run by 200 m under a condition where a safety razor is pressed onto the tape so that the knife edge is positioned lower by 0.5 mm than the level of the tape applied with a tension (running speed: 200 m/min, tension: 100 g) in a direction perpendicular to the tape surface. The height of the powder on the razor, which is cut off from the tape by the razor and adhered to the razor, is determined by a microscope, and the height is defined as the abraded amount (μm). If the abraded amount is not more than 180 μm, the abrasion resistance is determined to be "good", and if the abraded amount is more than 180 μm, the abrasion resistance is determined to be "not good".

(9) Abrasion resistance at low speed (low-speed razor abrasion test)

The film is slit into a tape having a width of ½ inch. The tape is run by 10 cm under a condition where a safety razor is pressed onto the tape so that the knife edge is positioned lower by 1.0 mm than the level of the tape applied with a tension (running speed: 3.3 cm/min, tension: 100 g) in a direction perpendicular to the tape surface. The height of the powder on the razor, which is cut off from the tape by the razor and adhered to the razor, is determined by a microscope, and the height is defined as the abraded amount (μm). If the abraded amount is not more than 40 μm, the abrasion resistance is determined to be "good", and if the abraded amount is more than 40 μm, the abrasion resistance is determined to be "not good".

9

(10) Electromagnetic conversion property

A magnetic coating solution having the following composition is coated with a gravure roll on the surface of the film so that the coated magnetic layer is magnetically oriented, and then it is dried. After calendering the film by a small test calendering machine (steel roll/nylon roll; 5 stages) at a temperature of 70° C. and a linear pressure of 200 kg/cm, the film is cured at 70° C. for 48 hours. The film obtained is slit to make a pancake of a tape having a width of ½ inch. The tape of 250 m from the pancake is incorporated into a VTR cassette to make a VTR cassette tape.

| (Composition of magnetic coating solution) (All parts are by weight.) | |
|---|---|
| Co-containing iron oxide | :100 parts |
| Vinyl chloride/vinyl acetate copolymer | :10 parts |
| Polyurethane elastomer | :10 parts |
| Polyisocyanate | :5 parts |
| Lecitin | :1 part |
| Methylethylketone | :75 parts |
| Methylisobutylketone | :75 parts |
| Toluene | :75 parts |
| Carbon black | :2 parts |
| Lauric acid | :1.5 parts |

100% chromatic signal generated by a television testing wave generator is recorded in the tape using a domestic VTR, and chromatic S/N is determined from the regenerated signal using a color video noise measuring apparatus (unit: dB).

EXAMPLES AND COMPARATIVE EXAMPLES

Preferred examples will be hereinafter explained together with comparative examples. The results of these examples and comparative examples are shown in Tables 1 to 4.

Example 1 (Table 1)

Polyethylene terephthalate pellets containing internally formed particles of 50 parts by weight and polyethylene terephthalate pellets containing no particles of 50 parts by weight were blended, and the blended pellets were supplied to a vent-type twin screw extruder No. 1 to melt the pellets at a temperature of 280° C. (polymer I). Polyethylene terephthalate pellets containing calcium carbonate particles having a mean particle diameter of 0.8 µm at a content of 0.2% by weight were dried at a temperature of 180° C. for 3 hours in a pressure-reduced condition (3 Torr), and thereafter the pellets were supplied to another extruder No. 2 to melt the pellets at a temperature of 290° C. (polymer II). After these two kinds of polymers were filtered at a high accuracy, the polymers were laminated in a feed block having a rectangular lamination portion for two-layer lamination structure such that the polymer II is placed at a position of layer B and the polymer I is placed at a position of layer A, and the laminated polymers were delivered out from a fish-tail type die in a form of a sheet. The delivered sheet was cast on a casting drum of which surface temperature was controlled at 30° C. and cooled and solidified on the drum using an electrostatic charging method to form a non-stretched film having a thickness of about 160 µm. The draft ratio between the die and the casting drum was 6.5.

The non-stretched film was stretched in the longitudinal direction at three stretching stages wherein the first stage was at 123° C. and 1.2 times, the second stage was at 126° C. and 1.45 times and the third stage was at 114° C. and 2.3 times. The uniaxially stretched film obtained was stretched in the transverse direction using a stenter at two stretching stages wherein the first stage was at 111° C. and 3.7 times and the second stage was at 113° C. and 1.2 times, and then the film was heat treated under a condition of a constant length at 200° C. for five seconds to make a film having a thickness of 14 µm. The ratio of lamination thicknesses of the obtained biaxially oriented film was ²/12 (µm) in the ratio of Layer A/layer B. The parameter of surface roughness (P10) thereof was 150, and the relative standard deviation of height distribution of the protrusions formed on the film surface was 0.8.

As the result of the estimation of the properties of the film and the video tape made therefrom, as shown in Table 1, the electromagnetic conversion property was 3.0 dB, the abrasion resistance at high speed of the surface of the layer A was 110 µm, and the abrasion resistance at low speed thereof in the low-speed razor abrasion test was 15 µm. Thus, when the the kind of the particles present in the layer A and the laminated structure satisfy the conditions specified by the present invention, excellent electromagnetic conversion property and abrasion resistance at high speed can be achieved.

EXAMPLES 2–5,

Comparative Example 1 (Table 1)

Biaxially oriented polyester films were prepared in a manner similar to that of Example 1. In Comparative Example 1, however, the film was a single layer film. In Examples 2–5, external particles belonging to the particles (A) according to the present invention were added to the laminated layer A in addition to the internally formed particles. In any of Examples 2–5 which satisfy the conditions specified by the present invention, excellent electromagnetic conversion property and abrasion resistance at high speed could be obtained.

EXAMPLES 6–12 (Table 2)

Biaxially oriented, laminated polyester films were prepared in a manner similar to that of Example 1. In these Examples, external particles belonging to the particles (B) according to the present invention were added to the laminated layer A in addition to the internally formed particles. In any of Examples 6–12 which satisfy the conditions specified by the present invention, excellent electromagnetic conversion property and abrasion resistance at high speed could be obtained.

EXAMPLES 13–16,

Comparative Examples 2–4 (Table 3)

Biaxially oriented, laminated polyester films were prepared in a manner similar to that of Example 1. In these Examples and Comparative Examples, both of external particles belonging to the particles (A) and belonging to the particles (B) according to the present invention were added to the laminated layer A in addition to the internally formed particles. In any of Examples 2–5 which satisfy the conditions specified by the present invention, excellent electromagnetic conversion property and abrasion resistance at high speed could be obtained. However, in Comparative Examples 2–4 which do not satisfy any of the conditions specified by the present invention, any of or all of the electromagnetic conversion property and abrasion resistance obtained were poor.

EXAMPLES 17–23,

Comparative Example 5 (Table 4)

Biaxially oriented, laminated polyester films were prepared in a manner similar to that of Example 1. In these Examples and Comparative Example, internally formed particles were not present in the layer A, but external particles belonging to the particles (B) according to the present invention were added to the laminated layer A at a small content. In any of Examples 17–23 which satisfy the conditions specified by the present invention, excellent electromagnetic conversion property and abrasion resistance at high speed could be obtained. However, in Comparative Example 5 which does not satisfy the condition of content specified by the present invention, the electromagnetic conversion property and abrasion resistance obtained were both poor.

TABLE 1

| | Internally formed particles | Particle A diamerter (μm) content (wt %) | Mean degree of agglomeration | Particle B diamerter (μm) content (wt %) | Mean degree of agglomeration | Lamination structure Thickness (μm/μm) | t/d | Parameter of surface roughness P10 | Relative standard deviation of height distribution of protrusions | Electro-magnetic conversion property (dB) | Abrasion resistance at high speed of layer A (μm) | Abrasion resistance at low speed of layer A (μm) |
|---|---|---|---|---|---|---|---|---|---|---|---|---|
| Example 1 | present | — | — | — | — | A/B 2/12 | — | 150 | 0.8 | 3 | 110 | 15 |
| Example 2 | present | zirconia (primary) 0.04 (secondary) 0.2 0.3 | 20 | — | — | A/B 2.5/12 | — | 190 | 0.9 | 2.1 | 130 | 18 |
| Example 3 | present | δ-alumina (primary) 0.02 (secondary) 0.1 0.3 | 18 | — | — | A/B 1.5/12.5 | — | 130 | 0.7 | 3.2 | 120 | 12 |
| Example 4 | present | δ-alumina (primry) 0.02 (secondary) 0.1 1.5 | 18 | — | — | A/B 1.5/12.5 | — | 180 | 1.1 | 1.6 | 150 | 21 |
| Example 5 | present | δ-alumina (primary) 0.02 (secondary) 0.16 0.3 | 85 | — | — | A/B 1.8/12.5 | — | 160 | 1.1 | 1.5 | 160 | 23 |
| Comparative Example 1 | present | — | — | — | — | Single layer | — | 360 | 1.5 | 0 | 200 | 41 |

TABLE 2

| | Internally formed particles | Particle A diamerter (μm) content (wt %) | Mean degree of agglomeration | Particle B diamerter (μm) content (wt %) | Mean degree of agglomeration | Lamination structure Thickness (μm/μm) | t/d | Parameter of surface roughness P10 | Relative standard deviation of height distribution of protrusions | Electro-magnetic conversion property (dB) | Abrasion resistance at high speed of layer A (μm) | Abrasion resistance at low speed of layer A (μm) |
|---|---|---|---|---|---|---|---|---|---|---|---|---|
| Example 6 | present | — | — | calcium carbonate 2.5 0.03 | 1.01 | A/B 1.8/12.5 | 0.72 | 370 | 1.4 | 1 | 165 | 37 |
| Example 7 | present | — | — | calcium carbonate 1.1 0.05 | 1.03 | A/B 1.5/12.5 | 1.36 | 220 | 1.1 | 1.6 | 140 | 28 |
| Example 8 | present | — | — | calcium carbonate 0.8 0.5 | 1.03 | A/B/A 1.0/12/1.0 | 1.25 | 160 | 0.9 | 2.5 | 130 | 26 |
| Example 9 | present | — | — | monodispersed spherical silica 0.3 2.5 | 1.02 | A/B 0.4/10 | 1.33 | 120 | 0.8 | 3.2 | 80 | 18 |
| Example 10 | present | — | — | divinyl-benzene 0.3 1.5 | 1.1 | A/B | 1.33 | 110 | 0.6 | 3.4 | 80 | 16 |
| Example 11 | present | — | — | calcium carbonate 1.1 0.3 | 1.02 | A/B/A 2.5/9/2.5 | 2.27 | 370 | 1.3 | 1.1 | 150 | 31 |
| Exam- | present | — | — | calcium | 1.02 | A/B/A | 1.82 | 320 | 1.3 | 2 | 160 | 18 |

TABLE 2-continued

| | Laminated layer A | | | | | | | Relative standard deviation of height distribution of protrusions | Electro-magnetic conversion property (dB) | Abrasion resistance at high speed of layer A (μm) | Abrasion resistance at low speed of layer A (μm) |
|---|---|---|---|---|---|---|---|---|---|---|---|
| | Internally formed particles | Particle A diameter (μm) content (wt %) | Mean degree of agglomeration | Particle B diameter (μm) content (wt %) | Mean degree of agglomeration | Lamination structure Thickness (μm/μm) | t/d | Parameter of surface roughness P10 | | | | |
| ple 12 | | | | carbonate 1.1 0.3 | | 2.0/9/2.0 | | | | | | |

TABLE 3

| | Laminated layer A | | | | | | | | Relative standard deviation of height distribution of protrusions | Electro-magnetic conversion property (dB) | Abrasion resistance at high speed of layer A (μm) | Abrasion resistance at low speed of layer A (μm) |
|---|---|---|---|---|---|---|---|---|---|---|---|---|
| | Internally formed particles | Particle A diameter (μm) content (wt %) | Mean degree of agglomeration | Particle B diameter (μm) content (wt %) | Mean degree of agglomeration | Lamination structure Thickness (μm/μm) | t/d | Parameter of surface roughness P10 | | | | |
| Example 13 | present | δ-alumina (primary) 0.02 (secondary) 0.1 0.3 | — | divinyl-benzene 0.45 0.3 | 1.1 | A/B/A 1.0/12/1.0 | 2.22 | 150 | 0.8 | 3.1 | 130 | 21 |
| Example 14 | present | zirconia (primary) 0.04 (secondary) 0.2 0.3 | 20 | divinyl-benzene 0.45 0.3 | 1.1 | A/B 1.5/12.5 | 3.33 | 120 | 0.6 | 3.5 | 90 | 21 |
| Example 15 | present | δ-alumina (primary) 0.02 (secondary) 0.2 0.3 | 18 | calcium carbonate 0.8 0.5 | 1.2 | A/B 1.0/6.0 | 1.25 | 140 | 0.6 | 2.8 | 120 | 30 |
| Example 16 | present | δ-alumina (primary) 0.02 (secondary) 0.2 0.3 | 25 | mono-dispersed spherical silica 0.2 0.5 | 1.03 | A/B/A 1.0/8/1.0 | 5.00 | 130 | 0.6 | 1.5 | 130 | 13 |
| Comparative Example 2 | present | θ-alumina (primary) 0.06 (secondary) 0.5 2.5 | 25 | calcium carbonate 1.1 3.5 | 1.02 | A/B 2.5/10 | 0.44 | 390 | 1.6 | 0.1 | 250 | 60 |
| Comparative Example 3 | present | δ-alumina (primary) 0.02 (secondary) 0.2 0.3 | 25 | calcium carbonate 3.1 0.5 | 1.03 | A/B/A 2.5/8/2.5 | 0.81 | 420 | 1.5 | −0.8 | 250 | 56 |
| Comparative Example 4 | present | θ-alumina (primary) 0.06 (secondary) 0.5 0.3 | 25 | calcuim carbonate 1.1 3.5 | 1.02 | A/B 5.0/8 | 4.55 | 355 | 1.6 | −2 | 220 | 48 |

TABLE 4

| | Laminated layer A | | | | | | | | Relative standard deviation of height distribution of protrusions | Electro-magnetic conversion property (dB) | Abrasion resistance at high speed of layer A (μm) | Abrasion resistance at low speed of layer A (μm) |
|---|---|---|---|---|---|---|---|---|---|---|---|---|
| | Internally formed particles | Particle A diameter (μm) content (wt %) | Mean degree of agglomeration | Particle B diameter (μm) content (wt %) | Mean degree of agglomeration | Lamination structure Thickness (μm/μm) | t/d | Parameter of surface roughness P10 | | | | |
| Example 17 | none | — | — | calcium carbonate 0.8 0.25 | 1.03 | A/B/A 1.0/8/1.0 | 1.25 | 160 | 0.8 | 2.1 | 150 | 22 |
| Example 18 | none | — | — | divinyl-benzene 0.45 0.25 | 1.08 | A/B/A 1.0/12/1.0 | 2.22 | 140 | 0.7 | 2.5 | 140 | 25 |
| Exam- | none | — | — | divinyl- | 1.08 | A/B/A | 6.67 | 240 | 0.9 | 2.6 | 160 | 25 |

TABLE 4-continued

| | Laminated layer A | | | | | | | Relative standard | | Abrasion | Abrasion |
|---|---|---|---|---|---|---|---|---|---|---|---|
| Internally formed particles | Particle A diamerter (μm) content (wt %) | Mean degree of agglomeration | Particle B diamerter (μm) content (wt %) | Mean degree of agglomeration | Lamination structure Thickness (μm/μm) | t/d | Parameter of surface roughness P10 | deviation of height distribution of protrusions | Electromagnetic conversion property (dB) | resistance at high speed of layer A (μm) | resistance at low speed of layer A (μm) |
| ple 19 | | | benzene 0.3 0.25 | | 2.0/10/2.0 | | | | | | |
| Example 20 | none | — | — | calcium carbonate 1.1 0.02 | 1.12 | A/B/A 0.2/10/0.2 | 0.18 | 220 | 1.1 | 1.8 | 130 | 28 |
| Example 21 | none | — | — | calcium carbonate 1.1 0.01 | 1.06 | A/B/A 0.3/10/0.3 | 0.27 | 230 | 1.1 | 2 | 120 | 31 |
| Example 22 | none | — | — | calcium carbonate 2.5 0.01 | 1.02 | A/B 1.8/12.5 | 0.72 | 340 | 0.8 | 0.8 | 170 | 36 |
| Example 23 | none | — | — | mino-dispersed spherical silica 0.45 0.25 | 1.03 | A/B/A 0.4/12/0.4 | 0.89 | 130 | 0.7 | 3.3 | 120 | 12 |
| Comparative Example 5 | none | — | — | calcium carbonate 1.1 0.6 | 1.2 | A/B 1.0/6.0 | 0.91 | 380 | 1.6 | −0.3 | 300 | 53 |

Although preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A biaxially oriented, laminated polyester film having a lamination structure comprising two outermost surfaces and at least two layers, wherein at least one of said surfaces comprises a thin laminated layer A having a lamination thickness of not less than 0.01 μm and not more than 3 μm, said thin laminated layer A containing mono-dispersed particles having a mean degree of agglomeration of less than 5 and a mean primary particle diameter of not less than 0.05 μm and not more than 3 μm at a content of not less than 0.05% by total weight of said film and less than 0.3% by total weight of said film.

2. The biaxially oriented, laminated polyester film according to claim 1, wherein the mean primary particle diameter of said mono-dispersed particles is in the range of 0.1 to 2 μm.

3. The biaxially oriented, laminated polyester film according to claim 2, wherein the mean primary particle diameter of said mono-dispersed particles is in the range of 0.2 to 1 μm.

4. The biaxially oriented, laminated polyester film according to claim 1, wherein the content of said mono-dispersed particles in said thin laminated layer A is not less than 0.1% by weight and less than 0.3% by weight.

5. The biaxially oriented, laminated polyester film according to claim 1, wherein the mean primary particle diameter "d" (μm) of said mono-dispersed particles and the thickness "t" (μm) of said thin laminated layer A satisfies the equation $0.2\ d \leq t \leq 10\ d$.

6. The biaxially oriented, laminated polyester film according to claim 5, wherein the mean primary particle diameter "d" (μm) of said mono-dispersed particles and the thickness "t" (μm) of said thin laminated layer A satisfies the equation $0.3\ d \leq t \leq 5\ d$.

7. The biaxially oriented, laminated polyester film according to claim 1, wherein a parameter of surface roughness (P10) of said thin laminated layer A is not more than 350 nm.

8. The biaxially oriented, laminated polyester film according to claim 7, wherein the parameter of surface roughness (P10) of said thin laminated layer A is not more than 300 nm.

9. The biaxially oriented, laminated polyester film according to claim 1, wherein a relative standard deviation of height distribution of protrusions formed on the surface of said thin laminated layer A is not more than 1.2.

10. The biaxially oriented, laminated polyester film according to claim 9, wherein the relative standard deviation of height distribution of protrusions is not more than 1.0.

11. The biaxially oriented, laminated polyester film according to claim 1, wherein an abrasion of the surface of said thin laminated layer A determined using a razor at a low film-running speed is not more than 40 μm.

* * * * *

UNITED STATES PATENT AND TRADEMARK OFFICE
CERTIFICATE OF CORRECTION

PATENT NO. : 5,677,034
DATED : October 14, 1997
INVENTOR(S) : Iwao Okazaki, Tohru Miyake, Koichi Abe and Keisuke Ohshima It is certified that error appears in the above-indentified patent and that said Letters Patent is hereby corrected as shown below:

In Column 11, under Table 2, row 6 (Example 10), column 7, under "A/B", please insert --0.4/10--.

Signed and Sealed this

Twenty-third Day of December, 1997

Attest:

BRUCE LEHMAN

Attesting Officer

Commissioner of Patents and Trademarks